Figure 1:
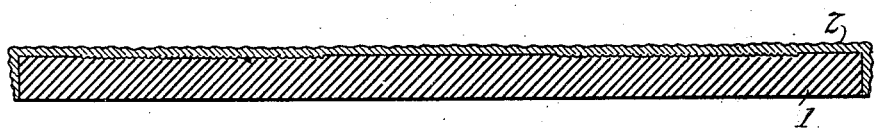

T. A. EDISON.
METHOD OF MAKING MOLDS FOR SOUND RECORDS.
APPLICATION FILED JUNE 10, 1911.

1,118,114.  Patented Nov. 24, 1914.

Witnesses:
Frank D. Lewis
Frederick Bachmann

Inventor:
Thomas A. Edison
by Frank L. Dyer
his Atty.

UNITED STATES PATENT OFFICE.

THOMAS A. EDISON, OF LLEWELLYN PARK, WEST ORANGE, NEW JERSEY, ASSIGNOR TO NEW JERSEY PATENT COMPANY, OF WEST ORANGE, NEW JERSEY, A CORPORATION OF NEW JERSEY.

METHOD OF MAKING MOLDS FOR SOUND-RECORDS.

1,118,114.   Specification of Letters Patent.   Patented Nov. 24, 1914.

Application filed June 10, 1911. Serial No. 632,366.

*To all whom it may concern:*

Be it known that I, THOMAS A. EDISON, a citizen of the United States, and a resident of Llewellyn Park, West Orange, in the county of Essex and State of New Jersey, have invented certain new and useful Improvements in Methods of Making Molds for Sound-Records, of which the following is a description.

My invention relates to methods of making molds for sound records, particularly those of the disk type. In forming these molds, it is common to coat the original wax record with a covering of graphite to render its surface electro-conductive, then to place it in an electro-plating bath and deposit a thin layer of copper thereon by electrolysis. The copper electrotype or matrix thus formed is then separated from the waxlike original record and backed up in any suitable way to give the same sufficient rigidity for use as a stamp or die to impress the record into the record material. It has heretofore been common to secure the backing, which is commonly made of metal, to the electrotype or matrix by soldering the said parts together over substantially the whole of the contacting surfaces. This method of securing the matrix or electrotype to the backing is objectionable as in nearly every case the soldering is uneven so that an uneven surface is produced in the matrix and in the record formed therefrom when said parts are subjected to the great pressure necessary to impress the record into the plastic material from which the duplicates are to be formed. The unevenness of the record produced in this way is the cause of some of the noises which are emitted when the record is reproduced.

It is the object of my invention to obviate the above named objection and to produce a mold which is strong and capable of producing an exact duplicate of the original sound record.

Broadly, my invention consists in an improved method of securing the matrix or electrotype to the backing in such a way as to obviate the necessity of soldering the whole of the two contacting surfaces thereof. This may be accomplished by finishing in any suitable way the contacting surfaces of the electrotype or matrix and the backing so that by submitting the same to pressure, the said parts may be caused to lie closely in engagement with each other, and then securing the same together at their edges.

In order that my invention may be more fully understood, attention is hereby directed to the accompanying drawings forming a part of this specification, and in which—

Figure 2:
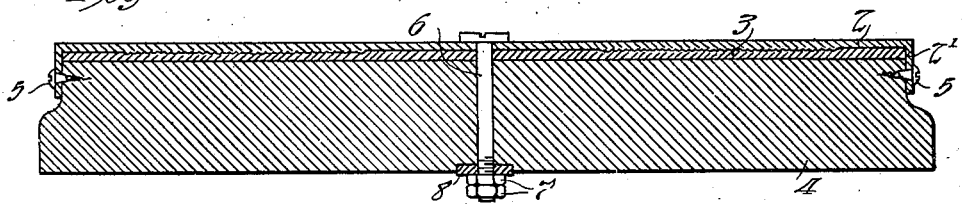
Figure 3:
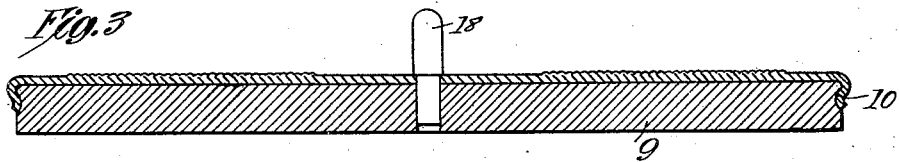
Figure 4:
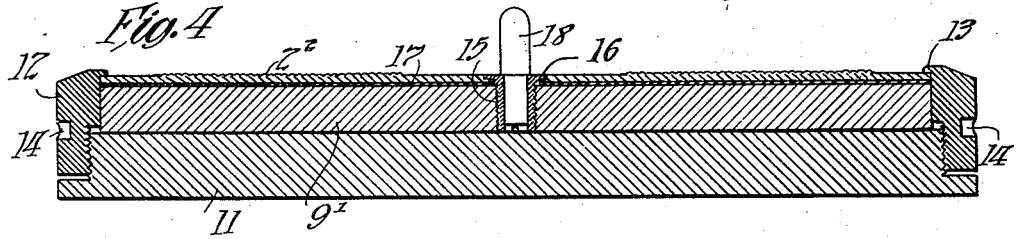

Figure 1 represents a central vertical section of the original master record with the electro-deposited matrix thereon; Fig. 2 represents a similar view showing the matrix mounted upon a suitable support or holder for use during the finishing of the rear or reverse surface thereof; Fig. 3 represents a similar view of a completed mold embodying my invention; and Fig. 4 represents a similar view of a modified form of mold.

In all of the views, like parts are designated by the same reference numerals.

Referring to the drawing, the numeral 1 represents the wax master record upon which the matrix 2 has been formed, as by electrolysis, in a copper bath. The outer surface of the matrix, as shown in Fig. 1, is more or less rough when removed from the bath. After detaching the electrotype or matrix from the master, I provide the same with a facing 3 of soft material, such as blotting paper or the like, and secure the flange 2' at the edge thereof upon a holder 4 in any suitable way, as by means of screws 5.

As shown in Fig. 2, a bolt 6 is passed through alined openings in the center of the matrix 2, the facing 3, and the holder 4 and is provided with nuts 7, 7 whereby it is adapted to assist in clamping the matrix to the holder.

The numeral 8 designates a washer interposed between the bottom of the holder 4 and the upper nut 7. The matrix 2, having been secured to the holder, is finished to a true surface, as by turning the same in a lathe and then polishing the surface thereof. After the backing 9 has been likewise turned true and polished, the matrix and the backing are superposed with their finished surfaces in contact and are subjected to pressure to force them into firm engagement with each other. The flange 2' on the matrix is then removed, as by cutting the same away in a lathe, or in any other suitable way, after which the edges of the matrix and backing are secured together. In my preferred construction, I spin the edge of the electrotype or matrix over the edge of the backing and into the shallow groove or depression 10 in the backing; but it is evident that the edges of the matrix and backing may be secured to each other by soldering or in any other suitable way.

In the modified form of my invention shown in Fig. 4, the matrix $2^2$ and the backing 9' are secured together and to a supporting plate 11 by means of a ring 12 threaded on to the periphery of the plate 11 and provided with an annular flange 13 overlying the edge of the matrix. Sockets 14 are provided in the ring 12 for the insertion of pins or other suitable means for turning the said ring to loosen or tighten the same. A sleeve 15 provided with a flange 16 seated in a depression in the top of the matrix is threaded to the center of the backing and assists in securing the matrix in place. I prefer to make the backing 9' of steel and the plate 11 of cast iron, the contacting surfaces of these parts being ground true but not polished. The opposing faces of the matrix and backing are turned and polished as described above.

The polish and trueness of the opposing surfaces of the matrix and backing need not be as great as is necessary when the surfaces are directly in contact with each other if a sheet 17 of tinfoil or other yielding material is laid between the opposing faces of the matrix and backing as shown in Fig. 4, such material yielding under the molding pressure and conforming readily to the slight irregularities in the said faces. This foil or equivalent material should, however, be very thin preferably no thicker than about .005 of an inch in order to prevent flowing of the same under the high pressures used in molding records of the commonly employed plastic material. It is evident that this foil may be used in all forms of my invention regardless of the particular method employed for securing together the edges of the matrix and backing.

The numeral 18 designates a pin secured to the center of the mold and adapted to center the blank in which the record is to be stamped.

While I have shown my invention as applied to disk records, it is evidently applicable to cylindrical records as well. The finishing of the opposing surfaces of the matrix and backing may be accomplished in any suitable way and numerous modifications may be made in the method described without departing from the spirit of my invention.

I do not claim herein my improved mold, the latter being claimed in another application, Serial No. 866,437, filed October 13, 1914 as a division of this case.

What I claim as new and desire to secure by Letters Patent is as follows:

1. The method of making molds for sound records consisting in forming a matrix of the original record, truing or finishing the reverse or unmolded surface thereof, forming a backing with a finished surface adapted to closely contact the finished surface of the matrix, superposing the matrix and backing with their finished surfaces in contact, subjecting the superposed matrix and backing to pressure to force the same to lie in close engagement with each other, and thereupon securing the matrix and backing together, substantially as described.

2. The method of making molds for sound records consisting in forming a matrix of the original record, truing or finishing the reverse or unmolded surface thereof, forming a backing with a finished surface adapted to closely contact the finished surface of the matrix, superposing the matrix and backing with their finished surfaces in contact, subjecting the superposed matrix and backing to pressure to force the same to lie in close engagement with each other, and securing the same together only at their edges, substantially as described.

3. The method of making molds for sound records consisting in forming a metallic matrix of the original record, forming a backing with a surface adapted to closely contact the rear surface of the matrix, superposing the matrix and backing with the said surfaces in contact, and spinning the edge of the matrix over the backing, substantially as described.

4. The method of making molds for sound records consisting in forming a metallic matrix of the original record, truing or finishing the reverse or unmolded surface thereof, forming a backing with a finished surface adapted to closely contact the finished surface of the matrix, superposing the matrix and backing with the finished surfaces in contact, subjecting the said parts to pressure to force the same to lie in close engagement with each other, and securing together the edges thereof, substantially as described.

5. The method of making molds for sound records consisting in forming a matrix of the original record, finishing the reverse or unmolded surface thereof, forming a backing with a finished surface having the same shape as the finished surface of the matrix, pressing the matrix and backing toward each other, and securing the same together at their peripheries but not intermediate their peripheries and centers, substantially as described.

6. The method of making molds for sound records consisting in forming a metallic matrix of the original record, truing or finishing the reverse or unmolded surface thereof, forming a backing with a surface adapted to closely contact the finished surface of the matrix, and with a groove or depression in the periphery thereof, superposing the matrix and backing, subjecting the said parts to pressure, and spinning the edge of the matrix over the backing into the said groove or depression, substantially as described.

7. The method of making molds for sound records consisting in forming a metallic matrix of the original record, truing and polishing the reverse or unmolded surface thereof, forming a backing with a true polished surface adapted to closely contact the finished surface of the matrix, superposing the matrix and backing with the polished surfaces in contact, subjecting the said parts to pressure, and securing the same together only at their edges, substantially as described.

8. The method of making molds for sound records consisting in forming a metallic matrix of the original record, facing the matrix with a soft material, and securing the same to a holder, truing and polishing the reverse or unmolded surface thereof, removing the matrix from the holder, forming a backing with a trued surface adapted to closely contact the trued surface of the matrix, superposing the matrix and backing, subjecting the said parts to pressure, and securing the same together at their peripheries but not intermediate their peripheries and centers, substantially as described.

This specification signed and witnessed this 8th day of June 1911.

THOS. A. EDISON.

Witnesses:
    FREDERICK BACHMANN,
    ANNA R. KLEHM.